United States Patent [19]

Mischke et al.

[11] Patent Number: 4,652,634

[45] Date of Patent: Mar. 24, 1987

[54] WATER-SOLUBLE MONOAZO COMPOUNDS CONTAINING A N-(SULFOALKYL)-ANILINE COUPLING COMPONENT AND A FIBER-REACTIVE GROUP OF THE VINYLSULFONYL SERIES IN THE PHENYL OR BENZOTHIAZOLE DIAZO COMPONENT, SUITABLE AS FIBER-REACTIVE DYESTUFFS

[75] Inventors: Peter Mischke, Bad Soden am Taunus; Hermann Fuchs, Königstein, both of Fed. Rep. of Germany

[73] Assignee: Hoechst Aktiengesellschaft, Frankfurt, Fed. Rep. of Germany

[21] Appl. No.: 819,988

[22] Filed: Jan. 15, 1986

Related U.S. Application Data

[63] Continuation of Ser. No. 623,635, Jun. 25, 1984, abandoned, and a continuation of Ser. No. 513,952, Jul. 15, 1983, abandoned, which is a continuation of Ser. No. 318,152, Nov. 4, 1981, abandoned.

[30] Foreign Application Priority Data

Nov. 6, 1980 [DE] Fed. Rep. of Germany ....... 3041891
Apr. 1, 1981 [DE] Fed. Rep. of Germany ....... 3113001

[51] Int. Cl.$^4$ .................. C09B 62/527; C09B 62/53; D06P 1/384; D06P 3/60
[52] U.S. Cl. ................................... 534/642; 534/593; 534/641; 534/887
[58] Field of Search .............................. 534/642, 641

[56] References Cited

U.S. PATENT DOCUMENTS 2,657,205 10/1953 Heyna et al. ........................ 534/642
3,951,944 4/1976 Fuchs .................................. 534/642
4,066,638 1/1978 Fuchs et al. ........................ 534/642

Primary Examiner—Floyd D. Higel
Attorney, Agent, or Firm—Curtis, Morris & Safford

[57] ABSTRACT

A water-soluble azo compund of formula

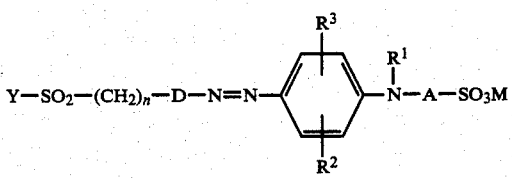

in which
Y is vinyl or —CH$_2$—CH$_2$—Z in which Z is chlorine, bromine, fluorine, lower alkanoyloxy, benzoyloxy, sulfobenzoyloxy, benzenesulfonyloxy, toluenesulfonyloxy, lower alkylsulfonylamino, arylsulfonylamino, phenoxy, dialkylamino, each alkyl being of from 1 to 4 carbon atoms, thiosulfato, phosphato or sulfato;
n is the number zero or 1;
D is phenylene unsubstituted or substituted by one or two substituents selected from the group consisting of lower alkyl, lower alkoxy, hydroxy, lower alkanoylamino, chlorine, bromine, fluorine and carboxy; by one nitro substituent; by one sulfo substituent; by one substituent of the formula Y—SO$_2$—(CH$_2$)$_n$— in which n is 1; by a plurality of substituents selected from the group consisting of said one or two substituents, said one nitro substituent, said one sulfo substituent and said one substituent of the formula Y—SO$_2$—(CH$_2$)$_n$—; or naphthylene substituted or mono- or disubstituted by sulfo; or the benzothiazol-2-yl radical in which the group Y—SO$_2$—(CH$_2$)$_n$— is bonded to its carbocyclic ring, or said radical in which the benzene ring is additionally substituted by lower alkyl, lower alkoxy, hydroxy, lower alkanoylamino, nitro, chlorine, bromine or sulfo;
R$^1$ is hydrogen, lower alkyl, lower alkenyl, lower alkyl substituted by phenyl or hydroxy or by both, lower alkyl substituted by phenyl which is substituted by substituents selected from the group consisting of methyl, methoxy and chlorine, or by said substituted phenyl and hydroxy, or is alkyl of from 2 to 4 carbon atoms substituted by acetoxy, propionyloxy or phenylsulfonyloxy or by cyano, or is alkyl of from 1 to 4 carbon atoms substituted by carboxy or carbonamido or carbalkoxy of from 1 to 4 carbon atoms in the alkyl moiety, or is halogenoalkyl of 2 or 3 carbon atoms or is lower halogenoalkenyl, or is a group of the formula —A—SO$_3$M;
A is ethylene, or propylene of the formula

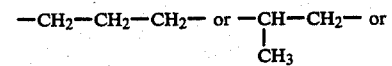

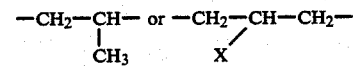

in which X is hydroxy, acetoxy, propionyloxy or phenylsulfonyloxy or is a halogen;
R$^2$ is hydrogen, lower alkyl, lower alkoxy unsubstituted or substituted by hydroxy, acetoxy, carboxy, carbamoyl, cyano or halogen, or is halogen or trifluormethyl;
R$^3$ is hydrogen, lower alkyl, lower alkoxy unsubstituted or substituted by hydroxy, acetoxy, carboxy, carbamoyl, cyano or halogen, or is halogen;
M is hydrogen or an alkali metal.

The new azo compounds are suitable as dyestuffs, in particular for dyeing or printing fibers which contain hydroxy groups or carbonamide groups, or leathers.

16 Claims, No Drawings

WATER-SOLUBLE MONOAZO COMPOUNDS CONTAINING A N-(SULFOALKYL)-ANILINE COUPLING COMPONENT AND A FIBER-REACTIVE GROUP OF THE VINYLSULFONYL SERIES IN THE PHENYL OR BENZOTHIAZOLE DIAZO COMPONENT, SUITABLE AS FIBER-REACTIVE DYESTUFFS

This application is a continuation of application Ser. No. 623,635, filed June 25, 1984, now abandoned, and a continuation of application Ser. No. 513,952, filed July 15, 1983, now abandoned, which is a continuation of Ser. No. 318,152, filed Nov. 4, 1981.

The invention relates to the industrial field of water-soluble azo dyestuffs which have fiber-reactive properties.

German Auslegeschrift No. 2,653,478 discloses azo dyestuffs which have fiber-reactive β-sulfatoethylsulfonyl groups and which contain N-β-sulfatoethylaniline coupling components. However, these known dyestuffs have certain technological deficiencies on application.

The present invention now provides new, valuable water-soluble azo compounds which have the general formula (1)

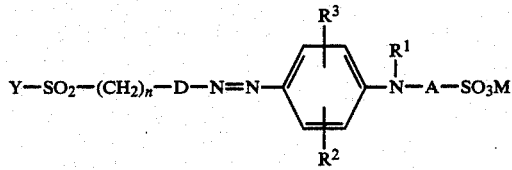

In this formula (1): Y is the vinyl group or a group of the formula —CH$_2$—CH$_2$—Z, in which Z is an organic or inorganic radical which can be eliminated under alkaline conditions, or is the hydroxy group, n is the number zero, 1 or 2, D is the phenylene radical which may additionally be substituted by 1 or 2 substituents from the group of lower alkyl, lower alkoxy, hydroxy, lower alkanoylamino, benzoylamino, benzoylamino substituted by lower alkyl, lower alkoxy, chlorine and/or sulfo, chlorine, bromine, fluorine and carboxy and/or by one nitro and/or by one sulfo group and/or by one group Y—SO$_2$—(CH$_2$)$_n$— in which n is herein 1 or 2 and Y defined as above, or is a naphthylene unsubstituted or substituted by 1 or 2 sulfo groups, or is the benzthiazol-2-yl-radical which contains the indicated group Y—SO$_2$—(CH$_2$)$_n$— bonded in the carbocyclic ring and which can be further substituted in the benzene ring by a substituent from the group comprising lower alkyl, lower alkoxy, hydroxy, lower alkanoylamino, benzoylamino, benzoylamino which is substituted by lower alkyl, lower alkoxy, chlorine and/or sulfo, nitro, chlorine, bromine and sulfo; R$^1$ is a hydrogen atom, a lower alkyl group, a lower alkenyl group or a lower alkyl group which is substituted by phenyl and/or hydroxy, it being possible for the phenyl radical to be substituted by methyl, methoxy and/or chlorine, such as, in particular, the benzyl group or phenethyl group and a hydroxyalkyl group having 2 to 4C atoms, or is an acid-esterified hydroxyalkyl group having 2 to 4C atoms in this alkyl radical, such as, for example, an acetoxyalkyl, propionyloxyalkyl or phenylsulfonyloxyalkyl group, a cyanoalkyl group having 2 to 4C atoms in the alkyl radical, a carboxy-, carbonamido or carbalkoxyalkylene group each having 1 to 4C atoms in the alkyl or alkylene radical, a halogenoalkyl group having 2 or 3C atoms, preferably a chloroalkyl group, or a lower halogenoalkenyl group, in which the halogen is preferably chlorine or bromine, or is a group of the formula —A—SO$_3$M defined below; A is the ethylene radical of the formula —CH$_2$—CH$_2$— or a propylene radical of the formula

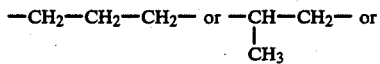

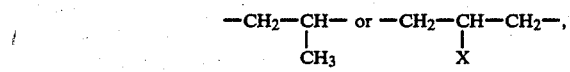

wherein X represents the hydroxy group or an acyloxy group of a lower alkanecarboxylic acid or of an aromatic carboxylic acid or of a lower alkanesulfonic acid or an aromatic sulfonic acid, for example the acetoxy, propionyloxy or phenylsulfonyloxy group, or a halogen atom, of which a chlorine or bromine atom is preferred; R$^2$ is a hydrogen atom, a lower alkyl group, of which a methyl group is preferred, or a lower alkoxy group, which can be substituted by hydroxy, acetoxy, carboxy, carbonamide, cyano or halogen, such as chlorine and bromine, or is a halogen atom, such as a chlorine, bromine or fluorine atom, of which a chlorine atom is preferred, or is a trifluoromethyl group; R$^3$ is a hydrogen atom, a lower alkyl group, of which a methyl group is preferred, or a lower alkoxy group, which can be substituted by hydroxy, acetoxy, carboxy, carbonamide, cyano or halogen, such as chlorine or bromine, or is a halogen atom, such as a chlorine, bromine or fluorine atom, of which a chlorine atom is preferred; M is a hydrogen atom or the equivalent of a mono-, di- or trivalent metal, preferably of an alkali or alkaline earth metal, such as of sodium, potassium or calcium.

The formula moieties R$^2$ and R$^3$ can have identical or different meanings.

The terms "lower" denote here, as in what follows, that the alkyl or alkylene or alkenyl radical contained in a group has 1 to 6 or 2 to 6C atoms, preferably 1 to 4 or 2 to 4.

Examples of the groups Z which can be eliminated under alkaline conditions are halogen atoms, such as a chlorine, bromine or fluorine atom, ester groups of organic carboxylic and sulfonic acids, such as a lower alkanoyloxy radical, for example the acetoxy radical, or an acyloxy radical of an aromatic carboxylic or sulfonic acid, such as a benzoyloxy, sulfobenzoyloxy, benzenesulfonyloxy or toluenesulfonyloxy radical, further lower alkylsulfonylamino and arylsulfonylamino groups, the phenoxy group, dialkylamino groups having alkyl groups of 1 to 4C atoms each, such as the dimethylamino or diethylamino group, and also monoester groups of, for example, thiosulfonic acid, phosphoric acid and in particular sulfuric acid.

The new azo compounds can be in the form of the free acid or in the form of their salts. They are preferably in the form of their salts, particularly the salts of the alkali metals and the alkaline earth metals, and amongst these, in particular, sodium salts, potassium salts and also calcium salts.

The new azo compounds are used, preferably in the form of these salts, as dyestuffs for dyeing and printing fibers which contain hydroxy groups and/or carbonamide groups, or leather.

The novel azo compounds of the invention described in any one of claims 2 to 9 are preferred.

The present invention further relates to a process for the preparation of the abovementioned and defined azo compounds of the general formula (1).

This process comprises diazotizing a compound of the general formula (2)

$$Y-SO_2-(CH_2)_n-D-NH_2 \quad (2)$$

in which D, n and Y have the abovementioned meanings, and coupling the product with a coupling component of the general formula (3)

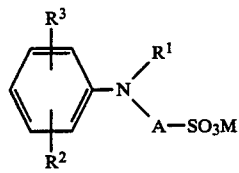

with M, A, $R^1$, $R^2$ and $R^3$ of the abovementioned meanings, and, if Y represents the β-hydroxyethyl group, converting the azo compound of the formula (1) having this β-hydroxyethyl group with the aid of a sulfating agent into the corresponding azo compound of the formula (1), in which Y represents the β-sulfatoethyl group, or with the aid of a phosphating agent into the corresponding compound of the formula (1), in which Y represents the β'-phosphatoethyl group, or into salts thereof.

Examples of suitable sulfating agents are 90 to 100% strength sulfuric acid, chlorosulfonic acid, amidosulfonic acid or other compounds which donate sulfur trioxide. Examples of suitable phosphating agents are concentrated phosphoric acid, pyrophosphoric acid, metaphosphoric acid or polyphosphoric acid, and also alkyl esters of polyphosphoric acid, phosphorus oxychloride or mixtures of phosphoric acid and phosphorus(V) oxide.

In particular the following are examples of aromatic amines of the general formula (2), which serve as diazo components in the preparation of the compounds according to the invention: 4-β-sulfatoethylsulfonyl-aniline, 4-β-chloroethylsulfonyl-aniline, 4-β-phosphatoethylsulfonyl-aniline, 4-vinylsulfonyl-aniline, 4-β-thiosulfatoethylsulfonyl-aniline, 2-sulfo-4-β-sulfatoethylsulfonyl-aniline, 2-chloro-5-β-chloroethylsulfonyl-aniline, 3-β-sulfatoethylsulfonyl-aniline, 2-bromo-5-β-sulfatoethylsulfonyl-aniline, 2,6-dichloro-4-β-sulfatoethylsulfonyl-aniline, 2,6-dibromo-4-β-sulfatoethylsulfonyl-aniline, 2,5-dichloro-4-β-sulfatoethylsulfonyl-aniline, 2-methyl-5-β-sulfatoethylsulfonyl-aniline, 2-methoxy-5-β-sulfatoethylsulfonyl-aniline, 2-methoxy-4-β-sulfatoethylsulfonyl-aniline, 2-methyl-6-chloro-4-β-sulfatoethylsulfonyl-aniline, 2,6-dimethyl-4-β-sulfatoethylsulfonyl-aniline, 2,6-dimethyl-3-β-sulfatoethylsulfonyl-aniline, 2,5-dimethoxy-4-β-sulfatoethylsulfonyl-aniline, 2-methoxy-5-methyl-4-β-sulfatoethylsulfonyl-aniline, 2-nitro-4-β-sulfatoethylsulfonyl-aniline, 4-nitro-2-β-sulfatoethylsulfonyl-aniline, 4-aminobenzoic acid-(3'-β-sulfatoethylsulfonyl)-anilide, 6-β-sulfatoethylsulfonyl-2-naphthylamine, 1-sulfo-6-β-sulfatoethylsulfonyl-2-naphthylamine, 8-β-sulfatoethylsulfonyl-2-naphthylamine, 6-sulfo-8-β-sulfatoethylsulfonyl-2-naphthylamine, 6-vinylsulfonyl-2-aminobenzthiazole, 6-β-sulfatoethylsulfonyl-2-aminobenzthiazole, 4-ω-(β-sulfatoethylsulfonyl)-tolylamine, 3-ω-(β-sulfatoethylsulfonyl)-tolylamine, 6-methoxy-3-ω-(β-sulfatoethylsulfonyl)-tolylamine, 4-methoxy-3-ω-(β-sulfatoethylsulfonyl)-tolylamine, 4-methyl-3,5-bis-(β-sulfatoethylsulfonylmethyl)-aniline, 4-ω-(β-sulfatoethylsulfonyl)-ethyl-aniline, 3-ω-(β-sulfatoethylsulfonyl)-ethyl-aniline, 5-(β-sulfatoethylsulfonyl-methyl)-1-naphthylamine and their β-hydroxyethylsulfonyl derivatives.

The compounds of the formula (2) are known and can be prepared by the method extensively described in the literature. For example, the preferred compounds of the formula (2) which have a β-sulfatoethylsulfonyl group are obtained from the corresponding β-hydroxyethylsulfonyl compounds through esterification, for example by means of aqueous or concentrated sulfuric acid or amidosulfonic acid, by, for example, adding the corresponding β-hydroxyethylsulfonyl-anilines and β-hydroxyethylsulfonylnaphthylamines to an equimolar amount of 60% strength sulfuric acid and subsequently heating the mixture, analogously to the process disclosed in German Patent Specification No. 1,150,163, or by, for example, dissolving the β-hydroxyethylsulfonylanilines or β-hydroxyethylsulfonylnaphthylamines in excess concentrated sulfuric acid or 100% strength sulfuric acid (monohydrate) at room temperature, or by reaction with amidosulfonic acid in the presence of pyridine or a pyridine base in a manner which is analogous to the esterification processes described in German Patent Specification No. 1,443,877. The β-sulfatoethylsulfonylanilines and β-sulfatoethylsulfonylnaphthylamines thus prepared can be used in the process according to the invention also without isolation, in the form of the reaction mixture obtained from the esterification.

The sulfoalkylanilines of the general formula (3) which are used as coupling components in the synthesis of the compounds of the general formula (1) can also be prepared in a known manner, for example by the procedures disclosed in German Offenlegungsschriften Nos. 1,481,831 and 1,493,636, and also by the methods described in R. B. Wagner and H. D. Zock, Synthetic Organic Chemistry, John Wiley and Sons, Inc., New York, 1953, pages 812–819, and also by reacting α,α'-dichlorohydrin with sodium sulfite, according to German Patent Specification No. 258,473, and condensing this reaction product with an aromatic amine, for example according to the reaction equation

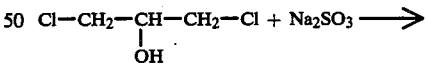

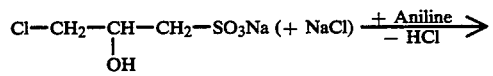

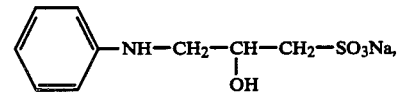

or by reacting propanesultone with aromatic amines.

β-Sulfoethylaniline derivatives can also be prepared by reacting β-chloroethanesulfonic acid or its salts with aromatic amines, for example according to the method described by J. W. James in Journ. prakt. Chem. [2] 31, 413 (1885). They can also be obtained in very high purity, for example by adding vinylsulfonyl fluoride to aniline derivatives and subsequently hydrolyzing the sulfofluoride group under alkaline conditions.

Examples of compounds of the general formula (3), which serve as coupling components in the preparation of the compounds according to the invention are: N-β-sulfoethyl-aniline, N-β-sulfoethyl-2-chloroaniline, N-β-sulfoethyl-3-chloroaniline, N-β-sulfoethyl-2-methylaniline, N-β-sulfoethyl-2-methoxyaniline, N-β-sulfoethyl-2-methyl-5-chloroaniline, N-β-sulfoethyl-2-methoxy-5-chloroaniline, N-β-sulfoethyl-2-chloro-5-methoxyaniline, N-β-sulfoethyl-2,5-dichloroaniline, N-β-sulfoethyl-N-methyl-aniline, N-β-sulfoethyl-N-ethyl-aniline, N-β-sulfoethyl-N-ethyl-3-methyl-aniline, N-β-sulfoethyl-N-ethyl-3-chloroaniline, N-β-sulfoethyl-N-allyl-aniline, N-β-sulfoethyl-N-benzyl-aniline, N-β-sulfoethyl-N-phenethyl-aniline, N-β-sulfoethyl-N-β-carbonamidoethyl-aniline, N-β-sulfoethyl-N-β-carboxyethyl-aniline, N-β-sulfoethyl-N-β-cyanoethyl-aniline, N-β-sulfoethyl-N-β-acetoxyethyl-aniline, N-β-sulfoethyl-N-β-hydroxyethyl-aniline, N-β-sulfoethyl-N-ethyl-2-methoxy-5-chloroaniline, N-β-sulfoethyl-N-β-hydroxyethyl-2-methoxy-5-chloroaniline, N-β-sulfoethyl-N-β-hydroxyethyl-3-chloroaniline, N-β-sulfoethyl-N-β-carboxyethyl-3-chloroaniline, N,N-bis-(β-sulfoethyl)-aniline, N,N-bis-(β-sulfoethyl)-3-methyl-aniline, N,N-bis-(β-sulfoethyl)-3-chloroaniline, N-γ-sulfopropyl-aniline, N-γ-sulfopropyl-3-chloroaniline, N-γ-sulfopropyl-2-methyl-5-chloroaniline, N-(γ-sulfo-β-hydroxypropyl)-2-methoxy-5-chloroaniline, N-(γ-sulfo-β-hydroxypropyl)-2-chloroaniline, N-(γ-sulfo-β-hydroxypropyl)-2,5-dichloroaniline, N-(γ-sulfo-β-hydroxypropyl)-N-ethylaniline, N-(γ-sulfo-β-hydroxypropyl)-N-ethyl-3-methylaniline, N-(γ-sulfo-β-acetoxypropyl)-N-β-acetoxyethyl-aniline, N-(γ-sulfo-β-hydroxypropyl)-N-phenethyl-aniline, N-(γ-sulfo-β-hydroxypropyl)-N-(β-hydroxyethyl)-2-methoxy-5-chloroaniline, N-(γ-sulfo-β-hydroxypropyl)-aniline, N-(γ-sulfo-β-hydroxypropyl)-2-chloro-3-methyl-aniline, N-(γ-sulfopropyl)-N-ethyl-3-methylaniline, N-(γ-sulfo-β-hydroxypropyl)-N-β-carboxyethyl-3-chloroaniline, N-(β-sulfo-γ-methyl-ethyl)-aniline, N-(β-sulfo-αmethyl-ethyl)-2-methoxy-5-chloroaniline, N,N-bis-(γ-sulfo-β-hydroxypropyl)-3-chloroaniline and N-(γ-sulfopropyl)-2,5-dichloroaniline.

The diazotization of the amines of the general formula (2) can be effected by generally known methods, for example by reacting an alkali metal nitrite and an inorganic acid, such as hydrochloric acid, sulfuric acid or phosphoric acid, or by using nitrosylsulfuric acid.

The coupling reaction with the coupling components of the general formula (3) can be carried out, in a way which is in itself known, in a neutral to acid medium, preferably in the pH range between 1 and 7 and at a temperature of between −5° C. and +25° C., if appropriate in the presence of sodium acetate or similar buffer substances which influence the rate of coupling, or in the presence of catalysts, such as, for example, dimethylformamide or pyridine.

The compounds of the formula (1), prepared according to the invention, can be separated from the reaction solution by salting-out with electrolytes, for example sodium chloride or potassium chloride, advantageously after the pH of the reaction mixture has been adjusted to 3.5 to 7.0; they are dried after filtration. Furthermore, the compounds according to the invention can be isolated from their synthesis batches by evaporation or spray-drying. In cases in which the resulting reaction solution contains relatively large amounts of sulfate ions, it is advisable to precipitate the sulfate ions in the form of sparingly soluble salts, for example as calcium sulfate, before the spray-drying. It is also possible to use the solutions of the compound of the formula (1) which are obtained in the synthesis directly as a liquid preparation in dyeing, if appropriate after a buffer substance has been added.

The new compounds of the formula (1) are suitable as dyestuffs, in particular as fiber-reactive dyestuffs; they are preferably applied to the substrates mentioned below by the application methods known for reactive dyestuffs and fast-fixed.

The present invention thus also relates to the use of the compounds of the formula (1) as dyestuffs, in particular for dyeing and printing cellulose fibers and natural or synthetic polyamide fibers or leathers, and to a process for dyeing and printing cellulose fiber materials or natural or synthetic polyamide fiber materials or leathers, using compounds of the formula (1). Preferred cellulose fiber materials are cotton and regenerated cellulose, such as viscose rayon, and linen, hemp and jute. Suitable polyamide fiber materials are in particular wool and other animal hairs and also silk, and in particular polyamide 6,6, polyamide 6, polyamide 11 or polyamide 4 amongst the synthetic polyamides.

For example, the azo compounds according to the invention give dyeings of very good color yield on cellulose fibers when applied by the exhaustion method using very diverse additions of alkali and at a long liquor ratio. Likewise excellent color yields are obtained on cellulose fibers when using the known padding methods, in which the compound of the formula (1) can be fixed by means of alkali by leaving the dyeing to stand at room temperature, by steaming or by using dry heat. In printing, there may be used the customary one-step methods in the presence of an acid-binding agent or alkali-donating agent, such as, for example, sodium bicarbonate, sodium carbonate or sodium trichloroacetate, in the printing paste with subsequent fixing by steaming, for example at 100°–103° C., or the two-step methods using neutral or slightly acid printing pastes, in which, after printing, the fiber material is either passed through a hot alkaline bath containing an electrolyte, or padded with an alkaline padding liquor containing an electrolyte, and the compound of the formula (1) is then fixed by steaming or by using dry heat.

These methods yield intense prints having well-delineated contours and a clear white ground. The appearance of the prints obtained is virtually independent of varying fixing conditions, and the prints thus have a satisfactory shade reproducibility.

Unlike the compounds (dyestuffs) according to the invention, the structurally closest dyestuffs of German Auslegeschrift No. 2,653,478 have the disadvantage that the sulfato groups of the known dyestuffs tend to hydrolyze when applied under certain conditions and the sulfuric acid thus liberated causes fiber-damage.

The fastness properties of dyeings and prints obtained on cellulose fiber materials with the compounds of the formula (1) are impressive and, of these, the most important manufacturing and end-use fastness properties, such as light-fastness, wash-fastness, for example at 60° C. or 95° C., fastness to acid or alkaline milling, water-fastness, seawater-fastness, fastness to acid cross-dyeing, alkaline and acid perspiration-fastness and also fastness to pleating, ironing and rubbing, are particularly worth emphasizing.

The natural as well as synthetic polymide fiber materials are dyed with the new compounds of the formula (1), preferably from an acid aqueous dyebath or acid aqueous dye liquor. The desired pH value of the dyebath or dye liquor is preferably adjusted using acetic acid and ammonium acetate or sodium acetate. In order to achieve an acceptable levelness of the dyeings or to improve the levelness, it is advantageous also to make use of customary leveling agents, for example compounds based on a reaction product of a fatty amine, such as, for example, stearylamine, with an alkylene oxide, such as ethylene oxide, and/or a reaction product of cyanuric chloride with an approximately three-fold molar quantity of an aminobenzenesulfonic acid and/or an aminonaphthalenesulfonic acid, in the dyebath or the dye liquor. The dyeings can, as is customary, be carried out at temperatures of 60°-105° C., preferably by the exhaustion method, in particular at the boiling point of the dyebath, or also in a pressure-dyeing apparatus at temperatures of up to 120° C.

The examples below serve to illustrate the invention. Unless otherwise indicated, the parts mentioned therein are parts by weight and the values in percent represent percentages by weight. Parts by volume are related to parts by weight in the same way as the liter is related to the kilogram.

EXAMPLE 1

28.1 parts of 4-β-sulfatoethylsulfonyl-aniline are added with stirring to 300 parts of water. After addition of 36 parts of 31% strength hydrochloric acid, the mixture is cooled to 5° C. 20 parts by volume of an aqueous 5N sodium nitrite solution are slowly added dropwise at this temperature and the mixture is further stirred for about 1 hour. Excess nitrous acid is destroyed with a little amidosulfonic acid.

In order to effect the coupling reaction a solution of 22.3 parts of the sodium salt of N-phenyltaurine in 150 parts of water are added; the pH value is adjusted to about 5.5 by the gradual addition of sodium bicarbonate. After coupling is complete, the azo compound formed is precipitated by potassium chloride (in a quantity which corresponds to 25 vol. % of the solution volume), filtered off with suction and dried at 60° C. under reduced pressure.

An orange-red powder contains electrolyte-salt, is obtained which gives a yellow-orange solution in water and contains the compound of the formula

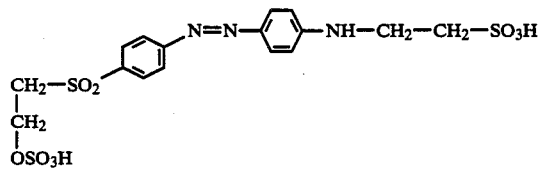

in the form of an alkali metal salt, predominantly as potassium salt. It is excellently suitable for dyeing (inclusive of printing) cotton by the application and fixing methods customary for fiber-reactive dyestuffs and yields yellowish orange dyeings and prints which have good light-fastness and wash-fastness properties.

EXAMPLE 1a

The procedure described in Example 1 is followed, but instead of N-phenyltaurine equivalent amount of N-(γ-sulfopropyl)-aniline or N-(γ-sulfo-β-hydroxypropyl)-aniline is used as coupling component. The corresponding alkali metal salts of the azo compounds of the formulae

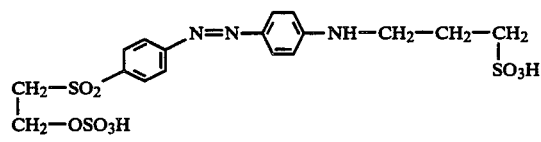

or

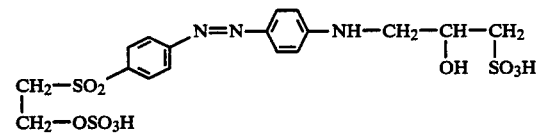

of similar shade to the azo compound according to the invention of Example 1 and just as good coloristic properties are obtained.

EXAMPLE 2

28.1 parts of 4-β-sulfatoethylsulfonyl-aniline are diazotized according to the procedure described in Example 1. After excess nitrous acid has been destroyed, a cooled solution of 27.15 parts of N-β-sulfoethyl-2-methyl-5-chloro-aniline in the form of the sodium salt in 150 parts of water is added and the coupling reaction is carried out, initially in a strongly acid range and later, after the addition of sodium bicarbonate, at a pH value of between 5.5 and 6.0. After coupling is complete, the azo compound is precipitated by adding potassium chloride, isolated by filtration and dried at 60° C. under reduced pressure.

An orange powder is obtained which in addition to electrolyte contains predominantly the potassium salt of the azo compound of the formula

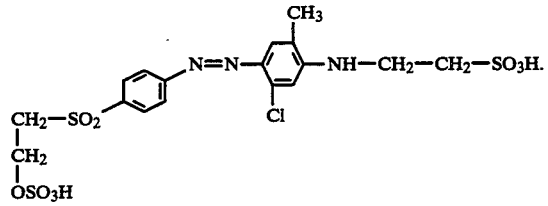

The azo compound is outstandingly suitable as dyestuff and yields clear golden orange dyeings and prints which have very good light-fastness and wet-fastness properties on cotton and wool, by customary and known application and fixing methods for fiber-reactive dyestuffs.

EXAMPLE 2a

The procedure described in Example 2 is followed, but instead of the coupling component used there an equivalent amount of N-(γ-sulfo-β-hydroxypropyl)-2-methyl-5-chloro-aniline or N-(γ-sulfopropyl)-2-methyl-5-chloro-aniline is used and the corresponding alkali metal salts of the azo compounds of the formulae

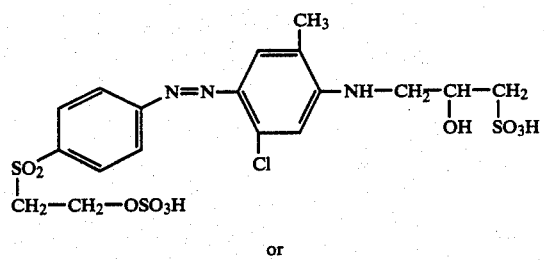

or

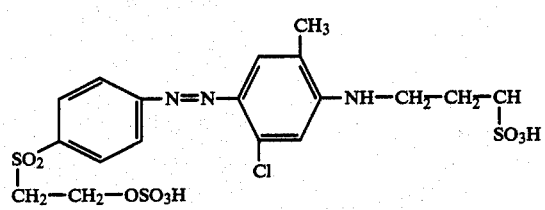

with a very similar shade to the azo compound according to the invention of Example 2 and just as good coloristic properties are obtained.

EXAMPLE 3

The procedure for diazotizing and coupling given in Example 1 is followed, but instead of the coupling component used there 28.75 parts of the sodium salt of N-β-sulfoethyl-2-methoxy-5-chloro-aniline are used. After the azo compound thus prepared is precipitated from the coupling batch with potassium chloride, an orange-red powder is obtained which in addition to electrolyte contains predominantly the potassium salt of the compound of the formula

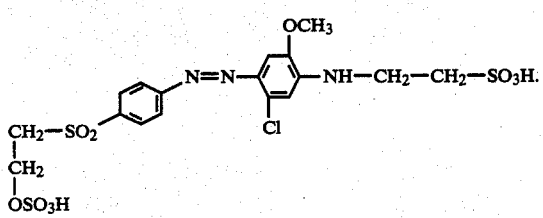

The compound is very suitable as dyestuff and yields orange dyeings on cotton and wool which have good lightfastness and very good resistance towards washing treatments.

EXAMPLE 3a

If instead of the coupling component mentioned in Example 3 an equivalent amount of the sodium salt of N-(γ-sulfo-β-hydroxypropyl)-2-methoxy-5-chloro-aniline is used and the procedure given in Example 3 is followed otherwise, then the corresponding dyestuff according to the invention is obtained which has a very similar shade and likewise very good coloristic properties.

EXAMPLE 4

The procedure for diazotizing and coupling given in Example 1 is followed, but instead of the coupling component used there 31.6 parts of the sodium salt of N-β-sulfoethyl-N-ethyl-2-methoxy-5-chloro-aniline is used. The azo compound thus prepared is isolated from the coupling solution either by adding sodium chloride to it or by spray-drying.

A red powder is obtained which in addition to electrolyte contains the sodium salt of the azo compound of the formula

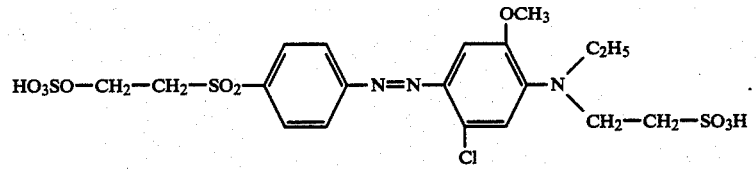

This compound is outstandingly suitable as dyestuff and yields yellowish red dyeings on cotton and wool, which have very good fastness properties.

EXAMPLE 5

28.1 parts of 4-β-sulfatoethylsulfonyl-aniline are diazotized analogously to the procedure given in Example 1 and the diazo suspension is allowed to run slowly into a cooled solution of 28.75 parts of the sodium salt of N-β-sulfoethyl-2-chloro-5-methoxy-aniline in 200 parts of water, the pH value of the coupling solution being maintained by the addition of sodium bicarbonate between 5 and 6.5. After coupling is complete, the resulting azo compound is isolated by spray-drying. An orange-red powder is obtained which in addition to electrolyte contains the sodium salt of the compound of the formula

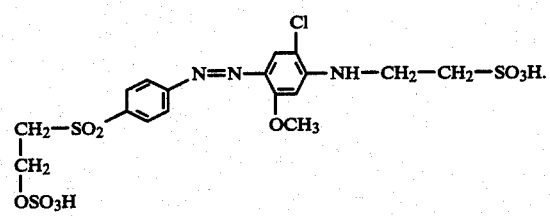

This compound is excellently suitable as reactive dyestuff for dyeing and printing cotton and wool and yields clear golden orange dyeings and prints, which have good light-fastness and very good wet-fastness properties.

EXAMPLE 6

28.1 parts of 4-β-sulfatoethylsulfonyl-aniline are diazotized analogously to the procedure given in Example 1.

In order to effect the coupling, 38.75 parts of the di-sodium salt of N,N-bis-(β-sulfoethyl)-3-chloro-aniline, dissolved in 200 parts of water, are added and the pH value of the coupling solution is adjusted to about 5.5 to 6.0 by the gradual addition of sodium bicarbonate. After the coupling is complete, the resulting azo compound is isolated by spray-drying. An orange-colored powder is obtained which in addition to electrolyte contains the sodium salt of the compound of the formula

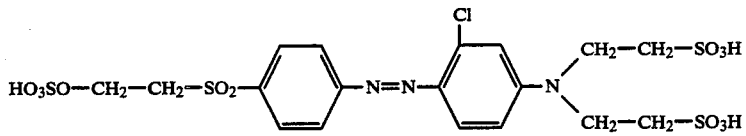

This is very suitable as reactive dyestuff for dyeing (inclusive of printing) cotton and wool and yields clear, golden orange dyeings and prints which have good light-fastness and very good wetfastness properties.

EXAMPLE 7

36 parts of 4-β-sulfatoethylsulfonyl-2-bromo-aniline are dissolved in 150 parts of water with 11.5 parts of sodium bicarbonate being added; 20 parts by volume of an aqueous 5N sodium nitrite solution are then added. After cooling to 0°–5° C., this mixture is poured into a mixture of 100 parts of ice and 36 parts by volume of 31% strength hydrochloric acid. During this addition, some of the resulting diazonium compound precipitates. Stirring is continued for about one hour at 0°–5° C. and excess nitrous acid is then destroyed with a little amidosulfonic acid.

In order to initiate the coupling reaction, this diazo suspension is then added in small portions to a cold solution of 26.5 parts of the sodium salt of N-β-sulfoethyl-N-ethyl-3-methyl-aniline in 200 parts of water and the pH value is maintained between 4 and 5 by sodium acetate which is added by sprinkling.

The azo compound formed is isolated from the coupling solution either by adding sodium chloride or by spray-drying. A dark red powder is obtained which in addition to electrolyte contains the sodium salt of the compound of the formula

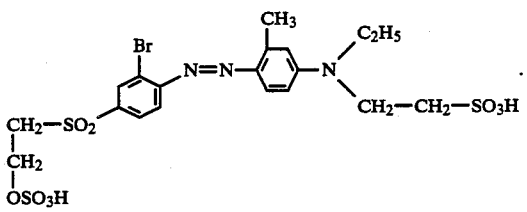

This compound is very suitable as dyestuff and yields intense, yellowish red dyeings and prints, which have good fastness properties, on cotton and wool, by application and fixing methods which are customary and known for fiber-reactive dyestuffs.

EXAMPLE 8

If instead of the coupling component used in Example 7, 29.5 parts of the sodium salt of N-(γ-sulfo-β-hydroxypropyl)-N-ethyl-3-methyl-aniline are used, the sodium salt of the compound of the formula

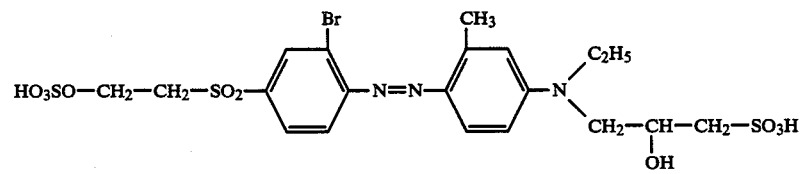

is obtained representing a dyestuff which has just as good properties and virtually the same shade as the dyestuff of Example 7.

EXAMPLE 9

The procedure for diazotizing and coupling described in Example 7 is followed, but instead of the coupling component indicated 38.1 parts of the sodium salt of N-(γ-sulfo-β-acetoxypropyl)-N-β-acetoxyethyl-aniline are used. After separation of the azo compound thus prepared by spray-drying, a red powder is obtained which in addition to electrolyte contains the sodium salt of the compound of the formula

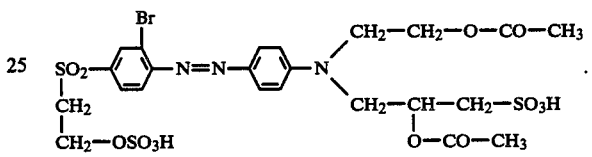

This yields yellowish red dyeings and prints, which have good all-round fastness properties, on cotton and wool, by dyeing methods which are customary for fiber-reactive dyestuffs.

EXAMPLE 10

The procedure for diazotizing and coupling indicated in Example 7 is followed, but instead of the coupling component used there 25.1 parts of the sodium salt of N-ethyl-N-sulfoethyl-aniline are used. After the azo compound thus prepared has been separated from the coupling batch with potassium chloride and dried, a red powder is obtained which in addition to electrolyte contains predominantly the potassium salt of the compound of the formula

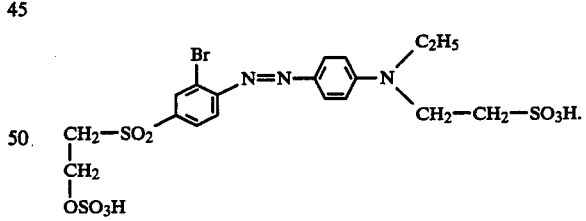

This yields on cotton and wool clear, yellowish red dyeings and prints, which have good lightfastness and very good resistance towards washing treatments, by application and fixing methods customary for reactive dyestuffs.

EXAMPLE 11

The procedure for diazotizing and coupling described in Example 7 is followed, but instead of the coupling component used there 36.7 parts of the disodium salt of N,N-bis-(β-sulfoethyl)-3-methyl-aniline are used. After isolating the azo compound thus prepared by spray-drying, a red powder is obtained which in addition to electrolyte contains the sodium salt of the compound of the formula

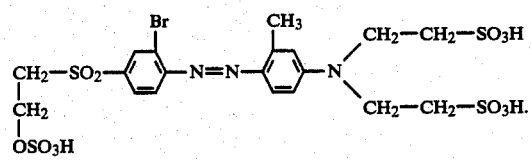

This yields yellowish red dyeings and prints, which have very good resistance towards washing treatments on cotton and wool, by dyeing methods customary for reactive dyestuffs.

EXAMPLE 12

A neutral solution of 41.1 parts of 2-amino-8-(β-sulfatoethylsulfonyl)-naphthalene-6-sulfonic acid in 200 parts of water is prepared by adding sodium bicarbonate, and 20 parts by volume of 5N sodium nitrite solution are added to it. This mixture is allowed to run slowly into a mixture of 200 parts of ice and 35 parts of 31% strength hydrochloric acid and the diazotization reaction is continued at about 10° C. with continued stirring for one hour. Excess nitrous acid is destroyed by the addition of a little amidosulfonic acid.

In order to initiate the coupling reaction, a cooled solution of 26.5 parts of the sodium salt of N-β-sulfoethyl-N-ethyl-3-methyl-aniline in 150 parts of water is added; the coupling reaction is led to completion by adjusting the pH value to 5.5 to 6 using sodium bicarbonate. The azo compound formed is isolated by spray-drying. A dark red powder is obtained which in addition to electrolyte contains the sodium salt of the compound of the formula

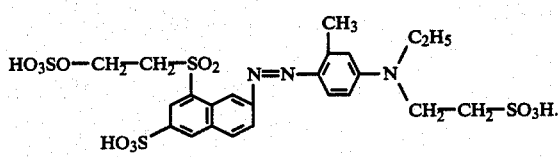

This yields on cotton and wool very intense yellowish red dyeings and prints, which have good lightfastness and very good wetfastness properties, by dyeing and printing methods customary for reactive dyestuffs.

EXAMPLE 13

24 parts of 2-amino-6-vinylsulfonyl-benzthiazole are dissolved in 140 parts by volume of 85% strength phosphoric acid, with heating, and the solution is then cooled externally to −5° C. By sprinkling on 6.9 parts of pulverized sodium nitrite the diazotization reaction is commenced at the same temperature; stirring is then continued for 2 hours. A cooled aqueous solution of 25.75 parts of the sodium salt of N-(2-chlorophenyl)-taurine is then slowly added dropwise at 0° C. and the mixture is stirred at the same temperature for about 2 hours. The azo compound precipitated is filtered off, stirred into water and the pH value of the mixture is adjusted to about 6 using sodium bicarbonate; the resulting solution is clarified at 50°-60° C. with diatomaceous earth, and the azo compound is precipitated at room temperature with potassium chloride, filtered off with suction and dried. A dark red powder, which contains electrolyte, is obtained which contains the alkali metal salt of the compound of the formula

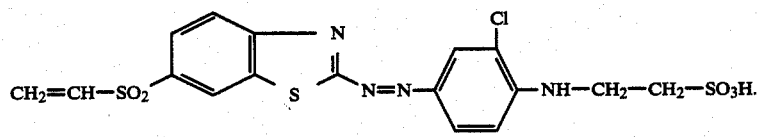

When applied to cotton and wool by using fixing methods customary for reactive dyestuffs, bluish red dyeings and prints of high color intensity result, which have good general fastness properties.

EXAMPLE 14

The procedure for diazotizing and coupling indicated in Example 13 is followed, but 35.3 parts of the disodium salt of N,N-bis-(β-sulfoethy)-aniline are used as the coupling component. The resulting azo compound, which is isolated by spray-drying, is obtained in the form of the sodium salt and corresponds to the formula

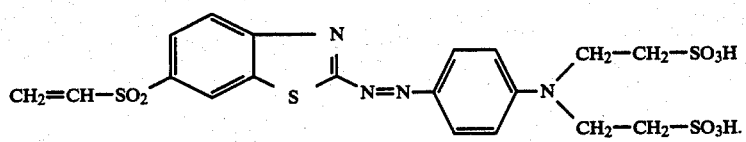

The azo compound is outstandingly suitable as reactive dyestuff and yields, after application to cotton and wool by the customary fixing methods, violet dyes and prints which have very good resistance towards washing treatments.

EXAMPLES 15 TO 78

The azo compounds of the general formula (1), according to the invention, which are characterized in the examples in the tables below by their diazo components according to the general formula (2) and coupling components according to the general formula (3) can also be prepared in a procedure according to the invention, for example according to the procedures of the illustrative examples above.

These fiber-reactive azo compounds according to the invention are distinguished by very good dyestuff properties with very good application properties and they yield dyeings and prints on the fiber materials mentioned in the descriptive section, in particular on cellulose fiber materials and wool, by the application and fixing methods customary for fiber-reactive dyestuffs, with good to very good fastness properties on cotton, in the shades indicated.

| Example | Diazo component corresponding to formula (2) | Coupling component corresponding to formula (3) | Shade on cotton |
|---|---|---|---|
| 15 | 4-β-sulfatoethylsulfonyl-aniline | 3-chloro-N—(β-sulfoethyl)-aniline | golden orange |
| 16 | 4-β-sulfatoethylsulfonyl-aniline | 2,5-dichloro-N—(β-sulfoethyl)-aniline | golden yellow |
| 17 | 4-β-sulfatoethylsulfonyl-aniline | 2-methyl-N—(β-sulfoethyl)-aniline | golden orange |
| 18 | 4-β-sulfatoethylsulfonyl-aniline | 2,6-dimethyl-N—(β-sulfoethyl)-aniline | yellowish orange |
| 19 | 4-β-sulfatoethylsulfonyl-aniline | 2,3-dichloro-N—(β-sulfoethyl)-aniline | yellowish orange |
| 20 | 4-β-sulfatoethylsulfonyl-aniline | 2-chloro-5-methyl-N—(β-sulfoethyl)-aniline | golden yellow |
| 21 | 4-β-sulfatoethylsulfonyl-aniline | 3-methoxy-N—(β-sulfoethyl)-aniline | yellowish brown |
| 22 | 4-β-sulfatoethylsulfonyl-aniline | N—ethyl-N—(β-sulfoethyl)-aniline | yellowish orange |
| 23 | 4-β-sulfatoethylsulfonyl-aniline | 2-methoxy-5-chloro-N—(β-hydroxyethyl)-N—(β-sulfoethyl)-aniline | yellowish red |
| 24 | 4-vinylsulfonylaniline | 2-methoxy-N—(βsulfoethyl)-aniline | orange |
| 25 | 4-β-phosphatoethylsulfonyl-aniline | N—butyl-N—(βsulfoethyl)-aniline | yellowish orange |
| 26 | 2-sulfo-4-β-sulfatoethylsulfonyl-aniline | 2,5-dichloro-N—(βsulfoethyl)-aniline | yellowish orange |
| 27 | 2-sulfo-4-β-sulfatoethylsulfonyl-aniline | 3-methyl-N—benzyl-N—(β-sulfoethyl)-aniline | yellowish red |
| 28 | 2-bromo-4-β-sulfatoethylsulfonyl-aniline | 3-methyl-N—(β-hydroxyethyl)-N—(β-sulfoethyl)-aniline | yellowish red |
| 29 | 2-bromo-4-β-sulfatoethylsulfonyl-aniline | N—(β-hydroxy-β-phenylethyl)-N—(β-sulfoethyl)-aniline | yellowish red |
| 30 | 2-methoxy-5-methyl-4-β-sulfatoethylsulfonyl-aniline | 2,5-dichloro-N—(β-sulfoethyl)-aniline | yellowish red |
| 31 | 2-methoxy-5-methyl-4-β-sulfatoethylsulfonyl-aniline | 2-methyl-5-chloro-N—(β-sulfoethyl)-aniline | orange |
| 32 | 2-methoxy-5-βsulfatoethylsulfonyl-aniline | 2,3-dichloro-N—(β-sulfoethyl)-aniline | yellowish orange |
| 33 | 2,6-dichloro-4-β-sulfatoethylsulfonyl-aniline | N—(β-sulfoethyl)-aniline | yellowish orange |
| 34 | 4-β-sulfatoethylsulfonyl-aniline | N—(β-acetoxyethyl)-N—(β-sulfoethyl)-aniline | yellowish orange |
| 35 | 4-β-sulfatoethylsulfonyl-aniline | 3-methyl-N—(β-cyanoethyl)-N—(β-sulfoethyl)-aniline | orange |
| 36 | 4-β-sulfatoethylsulfonyl-aniline | 3-chloro-N—(β-carboxyethyl)-N—(β-sulfoethyl)-aniline | yellowish orange |
| 37 | 2-nitro-4-β-sulfatoethylsulfonyl aniline | 3-chloro-N—(β-hydroxyethyl)-N—(β-sulfoethyl)-aniline | red |
| 38 | 2-β-sulfatoethylsulfonyl-4-nitro-aniline | 3-methyl-N—(β-acetoxyethyl)-N—(β-sulfoethyl)-aniline | bluish red |
| 39 | 3-β-sulfatoethylsulfonyl-aniline | N—(2-chloro-prop-1-en-3-yl)-N—(β-sulfoethyl)-aniline | yellowish orange |
| 40 | 2-methoxy-4-β-sulfatoethylsulfonyl-aniline | 3-methyl-N—ethyl-N—(β-sulfoethyl)-aniline | orange |
| 41 | 2,5-dimethoxy-4-β-sulfatoethylsulfonyl-aniline | N—methyl-N—(βsulfoethyl)-aniline | orange |
| 42 | 2-carboxy-4-β-sulfatoethylsulfonyl-aniline | 3-chloro-N—(β-acetoxyethyl)-N—(β-sulfoethyl)-aniline | orange |
| 43 | 2,6-dimethyl-4-β-sulfatoethylsulfonyl-aniline | N—(β-sulfoethyl)-aniline | orange |
| 44 | 2-chloro-6-methyl-4-β-sulfatoethylsulfonyl-aniline | N—(β-sulfoethyl)-aniline | orange |
| 45 | 2-bromo-5-β-sulfatoethylsulfonyl-aniline | N—methyl-N—(β-sulfoethyl)-aniline | orange |
| 46 | 2,5-dichloro-4-β-sulfatoethylsulfonyl-aniline | N—(β-hydroxyethyl)-N—(β-sulfoethyl)-aniline | reddish orange |
| 47 | 2,6-dibromo-4-β-sulfatoethylsulfonyl-aniline | N—(β-sulfoethyl)-aniline | orange |
| 48 | 8-β-sulfatoethylsulfonyl-2-naphthylamine-6-sulfonic acid | 2-methoxy-5-chloro-N—(β-sulfoethyl)-aniline | yellowish red |
| 49 | 8-β-sulfatoethylsulfonyl-2-naphthylamine-6-sulfonic acid | N—(2-bromo-prop-1-en-3-yl)-N—(β-sulfoethyl)-aniline | yellowish red |
| 50 | 6-β-sulfatoethyl-sulfonyl- | 3-chloro-N—ethyl-N—(β- | red |

-continued

| Example | Diazo component corresponding to formula (2) | Coupling component corresponding to formula (3) | Shade on cotton |
|---|---|---|---|
| | 2-naphthylamine-1-sulfonic acid | sulfoethyl)-aniline | |
| 51 | 4-β-sulfatoethylsulfonyl-aniline | 2,5-dichloro-N—(γ-sulfo-β-hydroxypropyl)-aniline | clear golden yellow |
| 52 | 4-β-sulfatoethylsulfonyl-aniline | 2-chloro-3-methyl-N—(γ-sulfo-β-hydroxypropyl)-aniline | clear yellowish orange |
| 53 | 4-β-sulfatoethylsulfonyl-aniline | N—ethyl-N—(γ-sulfo-β-hydroxypropyl)-aniline | |
| 54 | 4-β-sulfatoethylsulfonyl-aniline | 2-methoxy-5-chloro-N—ethyl-N—(γ-sulfo-β-hydroxypropyl)-aniline | yellowish red |
| 55 | 4-β-phosphatoethylsulfonyl-aniline | N—(β-sulfo-α-methylethyl)-aniline | yellowish orange |
| 56 | 4-vinylsulfonyl-aniline | N—ethyl-N—(γ-sulfo-β-hydroxypropyl)-aniline | orange |
| 57 | 2-sulfo-4-β-sulfatoethyl-sulfonyl-aniline | 3-chloro-N—(βchloroethyl)-N—(γ-sulfo-β-chloropropyl)-aniline | orange |
| 58 | 2-sulfo-4-β-sulfatoethyl- | 3-methyl-N—(β-hydroxy-β-phenyl-ethyl)-N—(γ-sulfo-β-hydroxypropyl)-aniline | reddish orange |
| 59 | 2-bromo-4-β-sulfatoethyl-sulfonyl-aniline | 3-methyl-N—ethyl-N—(γ-sulfo-β-acetoxypropyl)-aniline | yellowish red |
| 60 | 2-bromo-4-β-sulfatoethyl-sulfonyl-aniline | 2-methoxy-5-chloro-N—(β-hydroxyethyl)-N—(γ-sulfo-β-hydroxypropyl)-aniline | red |
| 61 | 2,6-dichloro-4-β-sulfato-ethylsulfonyl-aniline | N—(β-sulfo-α-methyl-ethyl)-aniline | yellowish orange |
| 62 | 2-nitro-4-β-sulfatoethyl-sulfonyl-aniline | N—ethyl-N—(γ-sulfo-β-hydroxypropyl)-aniline | red |
| 63 | 4-nitro-2-β-sulfatoethyl-sulfonyl-aniline | 3-methyl-N—methyl-N—(γ-sulfo-β-hydroxypropyl)-aniline | bluish red |
| 64 | 2-carboxy-4-β-sulfato-ethylsulfonyl-aniline | 3-chloro-N—(β-cyanoethyl)-N—(γ-sulfo-β-hydroxypropyl)-aniline | orange |
| 65 | 2,6-dibromo-4-β-sulfato-ethylsulfonyl-aniline | N—(β-carboxyethyl)-N—(γ-sulfo-β-hydroxypropyl)-aniline | orange |
| 66 | 8-β-sulfatoethylsulfonyl-2-aminonaphthalene-6-sulfonic acid | 2-methoxy-5-chloro-N—(β-sulfoethyl)-aniline | yellowish red |
| 67 | 6-β-sulfatoethylsulfonyl-2-aminonaphthalene-1-sulfonic acid | 2-methoxy-N—(γ-sulfo-β-hydroxypropyl)-aniline | red |
| 68 | 8-β-sulfatoethylsulfonyl-2-aminonaphthalene-6-sulfonic acid | 3-chloro-N—(γ-sulfopropyl)-aniline | reddish orange |
| 69 | 2-methoxy-4-β-sulfatoethyl-sulfonyl-aniline | N—methyl-N—(β-sulfo-α-methylethyl)-aniline | orange |
| 70 | 2-methoxy-5-methyl-4-β-sulfatoethylsulfonyl-aniline | 3-methyl-N—ethyl-N—(γ-sulfopropyl)-aniline | yellowish red |
| 71 | 6-vinylsulfonyl-2-aminobenzthiazole | 2-chloro-N—(γ-sulfo-β-hydroxypropyl)-aniline | bluish red |
| 72 | 6-β-sulfatoethylsulfonyl-2-aminobenzthiazole | N—ethyl-N—(γ-sulfopropyl)-aniline | bluish red |
| 73 | 8-β-sulfatoethylsulfonyl-2-aminonaphthalene | N,N—bis-(β-sulfoethyl)-3-chloro-aniline | reddish orange |
| 74 | 8-β-sulfatoethylsulfonyl-2-aminonaphthalene | N,N—bis-(β-sulfoethyl)-3-methylaniline | yellowish red |
| 75 | 4-(β-sulfatoethylsulfonyl-methyl)-aniline | N—(β-hydroxyethyl)-N—(β-sulfoethyl)-3-chloro-aniline | yellowish orange |
| 76 | 3,5-bis-(β-sulfatoethyl-sulfonyl-methyl)-4-methyl-aniline | N,N—bis-(γ-sulfo-β-hydroxypropyl)-3-chloro-aniline | yellowish orange |
| 77 | 4-ω-(β-sulfatoethylsulfonyl)-ethyl-aniline | N—ethyl-N—(β-sulfoethyl)-3-methyl-aniline | reddish orange |
| 78 | 5-(β-sulfatoethylsulfonyl-methyl)-1-naphthylamine | N,N—bis-(β-sulfoethyl)-aniline | reddish orange |

We claim:
1. A water-soluble azo compound of formula

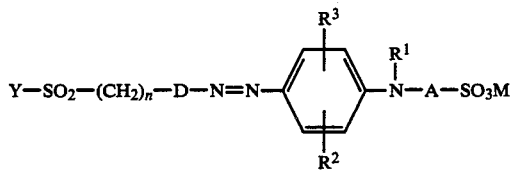

in which
- Y is vinyl or —CH₂—CH₂—Z in which Z is chlorine, bromine, fluorine, lower alkanoyloxy, benzoyloxy, sulfobenzoyloxy, benzenesulfonyloxy, toluenesulfonyloxy, lower alkylsulfonylamino, arylsulfonylamino, phenoxy, dialkylamino, each alkyl being of from 1 to 4 carbon atoms, thiosulfato, phosphato or sulfato;
- n is the number of zero or 1;
- D is phenylene unsubstituted or substituted by one or two substituents selected from the group consisting of lower alkyl, lower alkoxy, hydroxy, lower alkanoylamino, chlorine, bromine, fluorine and carboxy; by one nitro substituent; by one substituent of the formula Y—SO₂—(CH₂)ₙ— in which n is 1; by a plurality of substituents selected from the group consisting of said one or two substituents, said one nitro substituent and said one substituent of the formula Y—SO₂—(CH₂)ₙ—; or the benzothiazol-2-yl radical in which the group Y—SO₂—(CH₂)ₙ— is bonded to its carbocyclic ring, or said radical in which the benzene ring is additionally substituted by lower alkyl, lower alkoxy, hydroxy, lower alkanoylamino, nitro, chlorine, bromine or sulfo;
- R¹ is hydrogen, lower alkyl, lower alkenyl, lower alkyl substituted by phenyl or hydroxy or by both, lower alkyl substituted by phenyl which is substituted by substituents selected from the group consisting of methyl, methoxy and chlorine, or by said substituted phenyl and hydroxy, or is alkyl of 2 to 4 carbon atoms substituted by acetoxy, propionyloxy or phenylsulfonyloxy or by cyano, or is alkyl of 1 to 4 carbon atoms substituted by carboxy or carbonamido or carbalkoxy of from 1 to 4 carbon atoms in the alkyl moiety, or is halogenoalkyl of 2 or 3 carbon atoms or is lower halogenoalkenyl, or is a group of the formula —A—SO₃M;
- A is ethylene, or propylene of the formula

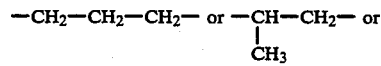

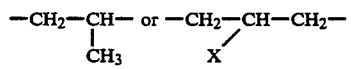

in which X is hydroxy, acetoxy, propionyloxy or phenylsulfonyloxy or is a halogen;
- R² is hydrogen, lower alkyl, lower akloxy unsubstituted or substituted by hydroxy, acetoxy, carboxy, carbamoyl, cyano or halogen, or is halogen or trifluormethyl;
- R³ is hydrogen, lower alkyl, lower alkoxy unsubstituted or substituted by hydroxy, acetoxy, carboxy, carbamoyl, cyano or halogen, or is halogen;
- M is hydrogen or an alkali metal.

2. A compound according to claim 1 of the formula

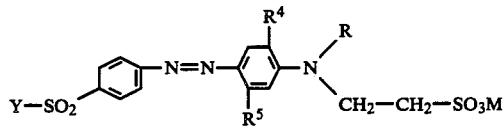

in which Y is vinyl or β-sulfatoethyl of the formula MO₃SO—CH₂—CH₂—, R⁴ is hydrogen or methyl or methoxy, R⁵ is hydrogen or chlorine and R is hydrogen or ethyl.

3. A compound according to claim 1 of the formula

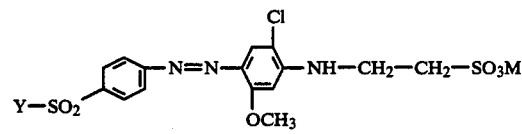

in which Y is vinyl or β-sulfatoethyl.

4. A compound according to claim 1 of the formula

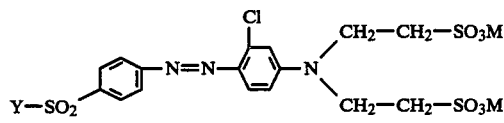

in which Y is vinyl or β-sulfatoethyl.

5. A compound according to claim 1 of the formula

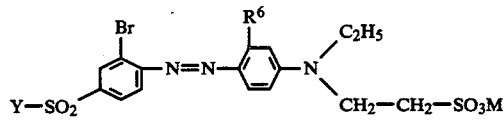

in which Y is vinyl or β-sulfatoethyl, R⁶ is hydrogen or methyl.

6. A compound according to claim 1 of the formula

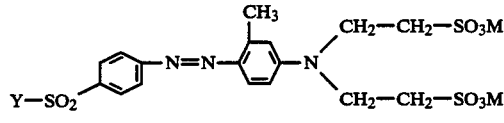

in which Y is vinyl or β-sulfatoethyl.

7. A compound of the formula

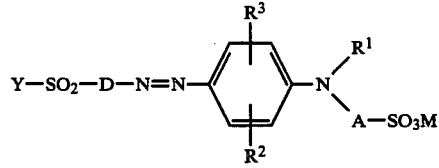

in which
- Y is vinyl or β-chloroethyl, β-acetoxyethyl, β-thiosulfatoethyl, β-phosphatoethyl or β-sulfatoethyl;
- D is phenylene unsubstituted or substituted by one or two substituents selected from the group consisting of lower alkyl, lower alkoxy, lower alkanoylamino, chlorine, bromine and carboxy, or by one nitro, or by one of these substituents and by one nitro or one sulfo;

D is the benzothiazol-2-yl radical in which the group Y—SO$_2$— is bonded to its benzene ring, or said radical additionally substituted by lower alkyl, lower alkoxy, chlorine or sulfo;

A is ethylene or propylene of the formula

—CH$_2$—CH$_2$—CH$_2$— or —CH—CH$_2$— or
                                  |
                                 CH$_3$

—CH$_2$—CH— or —CH$_2$—CH—CH$_2$—
            |                   \ /
           CH$_3$                X in which X is hydroxy, acetoxy, propionyloxy, chlorine or bromine;

R$^1$ is hydrogen, lower alkyl, benzyl, alkyl of from 1 to 4 carbon atoms substituted by phenyl, hydroxy, acetoxy, propionyloxy, cyano, carboxy, carbamoyl or chlorine, or is lower chloroalkenyl or lower bromoalkenyl or a group of the formula —A—SO$_3$M;

R$^2$ is hydrogen, lower alkyl, lower alkoxy unsubstituted or substituted by hydroxy, acetoxy, carboxy, carbamoyl, cyano or halogen, or is halogen or trifluoromethyl;

R$^3$ is hydrogen, lower alkyl, lower alkoxy unsubstituted or substituted by hydroxy, acetoxy, carboxy, carbamoyl, cyano or halogen, or is halogen;

M is hydrogen or an alkali metal.

8. A compound according to claim 7 of the formula

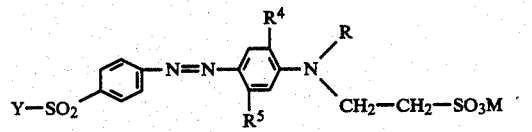

in which Y is vinyl or β-sulfatoethyl of the formula MO$_3$SO—CH$_2$—CH$_2$— R$^4$ is hydrogen or methyl or methoxy, R$^5$ is hydrogen or chlorine and R is hydrogen or ethyl.

9. A compound according to claim 7 of the formula

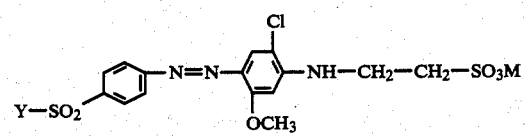

in which Y is vinyl or β-sulfatoethyl.

10. A compound according to claim 7 of the formula

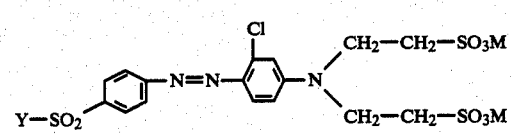

in which Y is vinyl or β-sulfatoethyl.

11. A compound according to claim 7 of the formula

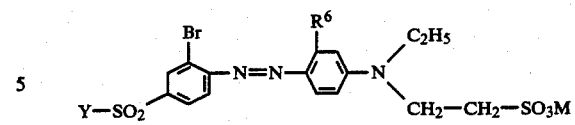

in which Y is vinyl or β-sulfatoethyl, and R$^6$ is hydrogen or methyl.

12. A compound according to claim 7 of the formula

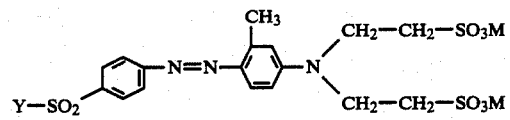

in which Y is vinyl or β-sulfatoethyl.

13. A compound according to claim 1 wherein Y is β-sulfatoethyl.

14. A water-soluble azo compound of the formula

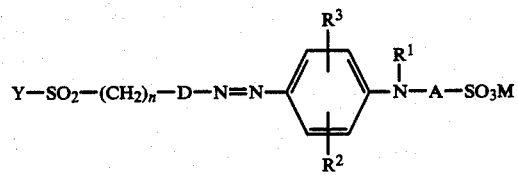

in which
Y is vinyl or the group —CH$_2$—CH$_2$—Z in which Z is an organic or inorganic radical which can be eliminated by an alkaline agent, or is hydroxy;

n is the number zero, 1 or 2;

D is the benzothiazol-2-yl radical wherein the group Y—SO$_2$—(CH$_2$)$_n$— is bonded to its carbocyclic ring or is said radical additionally substituted by lower alkyl, lower alkoxy, hydroxy, lower alkanoylamino, benzoylamino, benzoylamino substituted by substituents selected from the group consisting of lower alkyl, lower alkoxy, chlorine and sulfo, nitro, chlorine, bromine or sulfo;

R$^1$ is hydrogen, lower alkyl, lower alkenyl, lower alkyl substituted by phenyl or hydroxy or both or by phenyl substituted by substituents selected from the group consisting of methyl, methoxy and chlorine, or by said substituted pheny and hydroxy, or is hydroxyalkyl of from 2 to 4 carbon atoms or alkyl of from 2 to 4 carbon atoms substituted by acetoxy, propionyloxy or phenylsulfonyloxy, or is cyanoalkyl of from 2 to 4 carbon atoms in the alkyl moiety, or is alkyl of from 1 to 4 carbon atoms substituted by carboxy, carbamoyl or carbalkoxy of from 1 to 4 carbon atoms in the alkyl moiety, or is halogenoalkyl of 2 or 3 carbon atoms or is halogenoalkenyl of from 2 to 4 carbon atoms or is a group of formula —A—SO$_3$M;

A is ethylene, or proplyene of the formula

—CH$_2$—CH$_2$—CH$_2$— or —CH—CH$_2$— or
                                  |
                                 CH$_3$

-continued

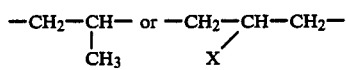

in which X is hydroxy or lower alkanoyloxy or lower alkanesulfonyloxy or phenylsulfonyloxy or halogen;

$R^2$ is hydrogen, lower alkyl, lower alkoxy unsubstituted or substituted by hydroxy, acetoxy, carboxy, carbamoyl, cyano or halogen, or is halogen or trifluoromethyl;

$R^3$ is hydrogen, lower alkyl, lower alkoxy unsubstituted or substituted by hydroxy, acetoxy, carboxy, carbamoyl, cyano or halogen, or is halogen;

M is hydrogen or an alkali metal.

15. A compound according to claim 7 wherein Y is β-sulfatoethyl.

16. A compound according to claim 14 wherein Y is β-sulfatoethyl.

* * * * *